United States Patent [19]

Chapman et al.

[11] 3,708,478

[45] Jan. 2, 1973

[54] CRYSTALLINE COMPLEX OF CEPHALORIDINE WITH AN ALKANE DIOL

[75] Inventors: John H. Chapman, Middlesex; Susan E. Staniforth, London, both of England

[73] Assignee: Glaxo Laboratories Limited, Middlesex, England

[22] Filed: July 7, 1970

[21] Appl. No.: 53,020

[30] Foreign Application Priority Data

July 24, 1967 Great Britain.....................37,298/69

[52] U.S. Cl...............................260/243 C, 424/246
[51] Int. Cl...............................C07d 99/24

[58] Field of Search....................260/243 C

[56] References Cited

UNITED STATES PATENTS 3,352,859  11/1967  Higgins et al.....................260/243 C

*Primary Examiner*—Nicholas S. Rizzo
*Attorney*—Bacon & Thomas

[57] ABSTRACT

A crystalline solvate of cephaloridine with certain alkane diols, e.g., propane -1,3-diol, butane -1,3-diol and butane -2,3-diol, a process for the preparation of such solvates and pharmaceutical compositions containing the solvates.

10 Claims, No Drawings

CRYSTALLINE COMPLEX OF CEPHALORIDINE WITH AN ALKANE DIOL

This invention is concerned with crystalline solvates of N-[7β-(2-thienylacetamido)ceph-3-em-3-ylmethyl] pyridinium-4-carboxylate (common name cephaloridine) and with techniques for the preparation of such solvates.

Several different crystalline forms of cephaloridine are known [see Chapman et al. J. Pharm. Pharmac., (1968), 20, 418–429]. The α- and β- forms have good solubility and rate of solution in water and hence possess important advantages in use over other forms of cephaloridine such as the δ-form. The α- and β-forms of cephaloridine do not, however, possess good thermal stability.

It is desirable to have available crystalline forms of cephaloridine that combine the advantages of the α- and β-forms with good thermal stability. We have found that this is largely achieved by certain crystalline solvates of cephaloridine. Furthermore these solvates are relatively non-hygroscopic.

According to the invention therefore there is provided a crystalline solvate of cephaloridine with an alkane diol having three to eight carbon atoms, two or three of the carbon atoms linking the oxygen atoms of the hydroxy groups, e.g., an alkane diol of the formula:

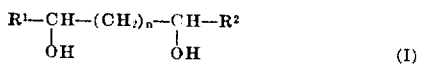

$$R^1-\underset{\underset{OH}{|}}{CH}-(CH_2)_n-\underset{\underset{OH}{|}}{CH}-R^2 \quad (I)$$

wherein $R^1$ and $R^2$, which may be the same or different, are each a hydrogen atom or a methyl group; and $n$ is 1 or, when $R^1 = R^2 = CH_3$, $n$ is 1 or 0.

Alkane diols of formula (I) include propane-1,3-diol, butane-1,3-diol, butane-2,3-diol, and pentane-2,4-diol.

The solvates appear to be 1:1 stoichiometric complexes of cephaloridine and the chosen diol.

The solvates may be prepared by, for example, contacting an acid addition salt of cephaloridine with the alkane diol in an aqueous or organic medium containing or to which is added an inorganic or organic base and allowing the solvate to crystallize out. The solvates may thus be prepared by:

i. contacting an aqueous or an organic solution of the cephaloridine salt containing the base with the diol;

ii. adding the base to a suspension or solution of the cephaloridine salt in an organic or aqueous medium containing the diol; or iii. adding the base and the diol to a suspension or solution of the cephaloridine salt in an organic or aqueous medium.

The solvate crystallizes from the solution and may be collected by filtration and worked up in the usual manner.

Suitable organic media which may be used can be selected from those described in British Pat. No. 1,101,561, e.g., dimethylformamide or dimethylacetamide.

The organic base may be a tertiary organic base such as a tri-(lower alkyl)amine, e.g., triethylamine. Preferably the organic base will have a pKb (as measured in water) of less than 6. Suitable inorganic bases include alkali metal and ammonium salts of weak acids, e.g., those having a pKa (as measured in water) greater than 4, e.g., carbonic acid and acetic acid, such as, for example, ammonium acetate and sodium bicarbonate.

Suitable acid addition salts for use in the preparation of the solvates include those deriving from acids having a pKa of 4 or less (as measured in water), e.g., the hydronitrate, hydrochloride, hydrobromide, sulphate, or phosphate. We particularly prefer to employ cephaloridine hydronitrate since this can be prepared in a state of high purity.

An alternative method of preparing the solvates according to the invention is by crystallization of the solvate from a solution or suspension of cephaloridine containing the alkane diol. This may be effected by dissolving cephaloridine in water, contacting the aqueous solution with the diol and allowing the cephaloridine solvate to crystallize out.

To complete crystallization it may be desirable to add a non-solvent, e.g., acetone to the mixture.

In cases where the chosen diol can exhibit optical activity it appears that only one optical isomer of the diol takes part in solvate formation with the cephaloridine, the other form apparently remaining unreactive. For example, in the case of a racemic mixture of butane-1,3-diol only the dextrorotary form takes part, the excess laevorotary form remaining in solution.

The solvates according to the invention may be formulated for administration in any convenient way by analogy with other antibiotic substances, such as penicillin and neomycin, and the invention thus includes within its scope a pharmaceutical composition for use in human or veterinary medicine comprising a crystalline solvate of cephaloridine with the alkane diol in association with a pharmaceutical carrier or excipient.

The solvents may thus be made up into injectable preparations in solution in suitable media, e.g., sterile, pyrogen-free water or as dry preparations suitable for the extempore preparation of injectable preparations. The compositions may further take the form of preparations for topical use, e.g., lotion ointments or creams, formulated with suitable excipients for such preparations.

For veterinary medicine the solvates may be formulated in a manner conventional in veterinary medicine particularly for injection as veterinary cerates with a veterinary create base.

In general the dosages employed in human medicine on adults will range from 200 mg (calculated as cephaloridine) of the compound per dose upwards, administered for example four times a day.

The solvates according to the invention may be administered in combination with other antibacterial antibiotics especially the penicillins such as penicillin G and/or the tetracyclines.

In order that the invention may be well understood the following examples are given by way of illustration only.

The 100° test referred to in the examples is an accelerated color test in which a small sample of the material under investigation is heated for 20 minutes in a test tube dipping into a boiling water bath. The degree of thermal stability is then measured by examining a 2 cm. layer of a 10% (w/v) aqueous solution of the material in a Lovibond tintometer. The 100° test may be regarded as a qualitative assessment of the degree of thermal stability by the test material. Low readings in this test indicate good thermal stability. The α-form of cephaloridine gives a reading of about 4.0Y, 0.8R. (Y = yellow; R = red).

EXAMPLE 1

Preparation of cephaloridine butane-1,3-diol solvate form cephaloridine hydronitrate a. Cephaloridine hydronitrate (2 g) is suspended in water (5 ml) and triethylamine (1 ml) is added whereupon all of the solid dissolves. Butane-1,3-diol (10 ml) is added and a solvate slowly crystallizes out. Excess acetone (50 ml) is added to complete crystallization. The solvate is filtered off, washed with acetone/butane-1,3-diol/water then acetone, and dried at 35° under reduced pressure for 18 $\nu_{max}$ (Nujol) 1775 ($\beta$-lactam), 1672 and 1544 (CONH), 1612 (CCO$^-$), 742, 720 and 682 cm$^{-1}$ (CH bending). $\lambda_{max}$ 240 nm $E_{1cm}^{1\%}$ 316, $\lambda_{max}$ 255 nm $E_{1cm}^{1\%}$ 293 (ratio 1.08). The n.m.r. (D$_2$O) spectrum resembles that of the $\alpha$-form of cephaloridine with the addition of 1 mole of butane-1,3-diol at 6.01, 6.28, 8.26 and 8.75 (Found: C, 54.3; H, 5.3; N, 7.9; S, 12.5; C$_{23}$H$_{27}$O$_6$N$_3$S$_2$ requires C, 54.6; H, 5.4; N, 8.3; S, 12.7%).

b. Cephaloridine hydronitrate (2g) is dissolved in butane-1,3-diol : acetonitrile, 1:1 (30 ml). Triethylamine (1 ml) is added and a solvate slowly crystallizes out. Excess acetone (20 ml) is added to complete crystallization.

c. Cephaloridine hydronitrate (3 g) is dissolved in dimethylacetamide (5 ml). Triethylamine (1.5 ml) and butane-1,3-diol (10 ml) are added and a solvate immediately crystallizes out. Excess acetone (20 ml) is added to complete crystallization and ease filtration.

EXAMPLE 2 a. Preparation of cephaloridine butane-1,3-diol solvate form $\alpha$- or $\delta$-cephaloridine $\alpha$- or $\delta$-cephaloridine (2 g) is dissolved with warming in water (5 ml) and butane-1,3-diol (5 ml) is added. After crystallization has occurred acetone (50 ml) is added to complete crystallization.

b. Preparation of cephaloridine butane-1,3-diol solvate from $\delta$- or $\mu$-cephaloridine $\delta$- or $\mu$-cephaloridine (2 g) is shaken for 6 hours with butane-1,3-diol (20 ml). After filtering, washing with acetone and crying, the solid is found to have become the butane-1,3-diol solvate.

EXAMPLE 3

Cephaloridine butane-1,3-diol solvate

Cephaloridine ($\delta$-form 9.76 g dry weight) was dissolved in water (20 ml) by warming to 35°. Butane-1,3-diol (40 ml) was added. The solution was stirred slowly and seeded with a few crystals of cephaloridine butane-1,3-diol solvate. The temperature was lowered to 25° and crystallization commenced after 5 minutes stirring. Stirring at 25° was continued for 3 ¾ hours before cooling with stirring to 6° during 1½ hours.

The product was collected by vacuum filtration and washed by displacement with 10 percent aqueous butane-1,3-diol (20 ml) followed by acetone slurries (2 × 20 ml) and an acetone displacement wash (20ml). The white crystalline solid was dried for 18 hours at 40° in vacuo to give cephaloridine butane-1,3-diol solvate (11.17 g, 94.0% theory) [$\alpha$]$_D$ + 42.1° (c 1.0 in water) Found: C 54.4; H 5.3; C$_{19}$H$_{17}$O$_4$N$_3$S$_2$, C$_4$H$_{10}$O$_2$ requires C 54.6; H 5.4%, n.m.r. (D$_2$O) showed one mole of butane-1,3-diol per mole of cephaloridine. 100° test : 0.4Y, 0.0R.

EXAMPLE 4

Cephaloridine butane-1,3-diol solvate

Cephaloridine ($\delta$-form 9.76g dry weight) was dissolved in water (25ml) at 35°. The solution was cooled to 25° and a solution of butane-1,3-diol (50 ml) in acetone (200 ml) was added over 1½ hours. Seeding with the solvate was carried out after the first 20 minutes. On completion of the addition, stirring was continued at 25° for a further 1 ¼ hours.

The product was collected by vacuum filtration and slurried with acetone (2 × 20 ml) followed by an acetone displacement wash (20 ml). The white crystalline solid was dried for 18 hours at 40° in vacuo to give cephaloridine butane-1,3-diol solvate (10.40g, 87.5% theory). [$\alpha$]$_D$+43.6°; n.m.r.(D$_2$O) as above. Found: C 54.5; H 5.3%. 100° test : 0.7Y, 0.2R.

EXAMPLE 5

Cephaloridine butane-1,3-diol solvate.

Cephaloridine hydronitrate (9.7 g) was suspended in water (25 ml) and treated with triethylamine (3 ml) to give a clear yellow solution. The solution was stirred at 20° and a mixture of butane-1,3-diol (50 ml) and acetone (200 ml) was added rapidly. Crystallization began after about 10 minutes and gentle stirring was continued for 4 hours. The solid was collected by filtration, washed with butane-1,3-diol in acetone (10% 25 ml), slurried with acetone (25 ml) and finally washed by displacement with acetone (25 ml). The product was dried at 40° in vacuo overnight to give cephaloridine butane-1,3-diol solvate (9.5 g; 93.0% theory) [$\alpha$]$_D$ + 43.6° n.m.r. (D$_2$O) as above. Found: C 54.4; H 5.2%. 100° test : 0.8Y, 0.3R.

EXAMPLE 6

Cephaloridine butane-1,3-diol solvate

Cephaloridine hydronitrate (9.7 g) was dissolved in water (25 ml) containing triethylamine (3slowly ml) at 20°. The solution was filtered and then added alowly to a well-stirred, seeded mixture of butane-1,3-diol (50 ml) and acetone (200 ml) at 20°. Stirring was continued for 4 hours and the solid was collected, washed and dried as above to give cephaloridine butane-1,3-diol solvate (9.0 g; 88.1% of theory) [$\alpha$]$_D$ + 44.7° n.m.r. (D$_2$O) as above. Found: C 54.9; H 5.4%. 100° test : 0.5Y, 0.1R.

EXAMPLE 7

Cephaloridine butane-1,3-diol solvate

Cephaloridine hydronitrate (10 g) was dissolved in water (15 ml) containing triethylamine (3 ml) at 20°. Butane-1,3-diol (50 ml) was added as a single charge and the mixture was stirred for 4 hours at 20°. The solid was collected, washed and dried as above to give cephaloridine butane-1,3-diol solvate (9.3g, 91.0% theory). [$\alpha$]$_D$ + 43.1°; n.m.r. (D$_2$O) as above. Found: C 54.5; H 5.3%. 100° test : 0.2Y, 0.1R.

EXAMPLE 8

Cephaloridine propane-1,3-diol solvate

Cephaloridine hydronitrate (5 g) is suspended in propane-1,3-diol (75 ml) and triethylamine (2.5 ml) added whereupon all the solid dissolves. A solvate then slowly crystallizes out and acetone (50 ml) is added to complete crystallization. The solvate is filtered off, washed with acetone and dried at 35° under reduced pressure for 18 hours. $\nu_{max}$ (Nujol) 1782 ($\beta$-lactam), 1680 and 1562 (CONH), 1620 (COO$^-$), 797, 778, 746, 717 and 685 cm$^{-1}$ (CH bending). $\lambda_{max}$ 240 nm $E_{1cm}^{1\%}$ 321, $\lambda_{max}$ 255 nm $E_{1cm}^{1\%}$ 299 (ratio 1.08) (calc. for 1 mole propane-1,3-diol 322, 293). The n.m.r. (D$_2$O) spectrum resembled that of unsolvated cephaloridine, with the addition of peaks at 8.20 and 6.30 $\tau$ corresponding to 1 mole propane-1,3-diol. (Found: C, 53.2; H, 5.2; N, 8.4; C, 13.2; $C_{22}H_{25}O_6N_3S_2$ requires C, 53.8; H, 5.1; N, 8.5; S, 13.0%). 100° test : 0.8Y, 0.3R.

EXAMPLE 9

Cephaloridine butane-2,3-diol solvate

Cephaloridine hydronitrate (2 g) is dissolved in butane-2,3-diol:acetonitrile,1:1 (10 ml). Triethylamine (1 ml) is added. A solvate crystallizes out on cooling, and acetone (50 ml) is added to complete precipitation. $\nu_{max}$ (Nujol) 1780 ($\beta$-lactam), 1675 and 1567 (CONH), 1615 (COO$^-$), 777, 737, 719 and 687 (CH bending). $\lambda_{max}$ 240 nm $E_{1cm}^{1\%}$ 313, $\lambda_{max}$ 255 nm $E_{1cm}^{1\%}$ 288 (ratio 1.09) (Calc. for 1 mole butane-2,3-diol : 313, 285). n.m.r. (D$_2$O) additional peaks at 8.76, 6.3$\tau$ for 1 mole butane-2,3-diol. (Found:C, 53.7; H 5.0; N, 8.0; S, 12.4 $C_{23}H_{27}O_6N_3S_2$ requires C, 54.6; H,5.4; N, 8.3; S, 12.7%). 100° test : 0.5Y, 0.3R.

EXAMPLE 10

Cephaloridine pentane-2,4-diol solvate

Cephaloridine (1 g $\delta$- form) is dissolved with warming in water (2 ml) and pentane-2,4-diol (10 ml) is added. The solvate crystallizes out at room temperature, and acetone (25 ml) is added to complete precipitation. $\nu_{max}$ (Nujol) 1780 ($\beta$-lactam), 1682 and 1549 (CONH), 1615 (COO$^-$) 797, 777, 735 and 689 cm$^{-1}$ (CH bending). $\lambda_{max}$ 240 nm $E_{1cm}^{1\%}$ 304, $\lambda_{max}$ 255 $E_{1cm}^{1\%}$ 278 (ratio 1.09) (calc. for 1 mole pentane-2,4-diol; 305, 277). n.m.r. (D$_2$O) additional peaks at 8.78, 8.38 and 6.0 $\tau$ for 1 mole pentane-2,4-diol. (Found C, 55.2; H, 5.3; N, 7.7; S, 12.3 $C_{24}H_{29}O_6N_3S_2$ requires C, 55.5; H, 5.6; N, 8.1; S, 12.3%). 100° test: 0.5Y, 0.1R.

EXAMPLE 11

Cephaloridine butane-1,3-diol solvate

Cephaloridine hydronitrate (9.73 g) was added portionwise to a stirred suspension of sodium bicarbonate (1.8 g) in water (12 ml). The solid dissolved slowly with evolution of carbon dioxide. The clear solution was added dropwise to stirred butane-1,3-diol (50 ml), and washed in water with (3 ml). The mixture was stirred at 20° for 4 hours. The solid was collected by filtration and washed with a 10 percent solution of butane-1,3-diol in acetone (25 ml) and with acetone (2 × 25 ml) and dried overnight at 40° in vacuo to give cephaloridine butane-1,3-diol solvate (9.3g; 90.5% of theory) n.m.r. (D$_2$O) showed one mole of butane-1,3-diol per mole of cephaloridine. Found: C 54.3%; H 5.3%. 100°test: 0.1Y; 0.0R.

EXAMPLE 12

Cephaloridine butane-1,3-diol solvate

Cephaloridine hydronitrate (9.73 g) was added portionwise to a solution of ammonium acetate (1.6 g) in water (12 ml) to give a clear solution, which was added dropwise over 20 minutes to stirred butane-1,3-diol (50 ml) containing a few seeds of the cephaloridine solvate and washed in with water (3 ml). The mixture was stirred at 20° for 4 hours. The solid was collected by filtration, washed with a 10 percent solution of butane-1,3-diol in acetone (25 ml) and with acetone (2 × 25 ml), and then dried overnight at 40° in vacuo to give cephaloridine butane-1,3-diol solvate (9.3g 90.5% of theory) n.m.r. (D$_2$O) showed one mole of butane-1,3-diol per mole of cephaloridine. Found: C 54.6%; H 5.4%. 100° test : 0.2Y, 0.0R.

EXAMPLE 13

Cephaloridine butane-1,3-diol solvate

Cephaloridine ($\delta$-form, dry wt. 9.64 g.) was dissolved in water (25 ml.) at 35°. The solution was added to butane-1,3-diol (50 ml) at 25° with stirring. The mixture was seeded and stirred at 25° for 3 hours. The temperature was lowered to 5° during 1 hour and the mixture was kept in the refrigerator overnight.

The product was filtered and washed with 10 percent aqueous butane-1,3-diol (20 ml.), followed by acetone slurries (2 × 10 ml.) and an acetone displacement wash (20 ml.)

The solid was dried for 18 hours in vacuo at 40° to give cephaloridine butane-1,3-diol solvate (10.72 g. 91.5% theory) $[\alpha]_D$ + 42.5° (c 1.0 in water). N.m.r. (D$_2$O) showed one mole of butane-1,3-diol per mole of cephaloridine. (Found: C 54.4; H 5.4; N 8.2%.) 100° test : 0.4Y, 0.0R.

EXAMPLE 14

Cephaloridine butane-1,3-diol solvate

Cephaloridine hydronitrate (9.73 g. dry wt.) was dissolved in a mixture of water (12 ml.) and triethylamine (3 ml.) and the solution was added dropwise over 10 minutes to stirred butane-1,3-diol at 20°, containing a seed of the cephaloridine solvate. The aqueous solution was followed through by a water wash (3 ml.).

The mixture was stirred at 20° for 4 hours. The solid was collected and washed by displacement with 10 percent aqueous butane-1,3-diol (10 ml.) and 10 percent butane-1,3-diol in acetone (25 ml.), followed by an acetone slurry (25 ml.) and a displacement was with acetone (25 ml.). The product was dried at 40° in vacuo to give cephaloridine butane-1,3-diol solvate (9.3 g.; 90.5% theory) $[\alpha]_D$ + 44.6°; n.m.r. (D$_2$O) showed one mole of butane-1,3-diol per mole of cephaloridine. (Found: C, 54.7; H, 5.4; N, 8.0%). 100° test : 0.3Y, 0.0R.

X-ray crystallographic data in respect of the five cephaloridine solvates prepared in the Examples are given in the following tables. Interplanar spacings [d (A)] as measured from using copper K$\alpha$-radiation are given as well as relative intensities of the lines according to the following arbitrary basis:

s = strong
m = medium
w = weak
f = faint
v = very
d = diffuse

TABLE I

Cephaloridine - pentane-2,4-diol solvate

| d(A) | I | d(A) | I | d(A) | I | d(A) | I |
|---|---|---|---|---|---|---|---|
| 9.08 | w | 3.43 | w | 2.48 | vw | 1.91 | wd |
| 8.30 | w | 3.37 | m | 2.46 | vw | 1.90 | wd |
| 7.82 | vw | 3.35 | vw | 2.45 | w | | |
| 7.59 | m | 3.32 | w | 2.41 | w | | |
| 6.30 | s | 3.26 | m | 2.40 | vw | | |
| 6.20 | m | 3.19 | vw | 2.38 | w | | |
| 5.97 | m | 3.16 | wd | 2.30 | w | | |
| 5.17 | m | 3.10 | wd | 2.26 | vw | | |
| 5.11 | w | 3.03 | wd | 2.24 | vw | | |
| 4.94 | m | 2.93 | w | 2.22 | vw | | |
| 4.84 | m | 2.87 | w | 2.21 | w | | |
| 4.61 | m | 2.84 | w | 2.18 | w | | |
| 4.38 | m | 2.79 | m | 2.16 | vw | | |
| w 4.02 | vs | 2.77 | w | 2.15 | w | | |
| 3.99 | vw | 2.76 | w | 2.13 | wd | | |
| 3.94 | w | 2.74 | vw | 2.11 | wd | | |
| 3.89 | w | 2.70 | w | 2.09 | w | | |
| 3.86 | m | 2.68 | w | 2.07 | w | | |
| 3.82 | s | 2.66 | | 2.06 | w | | |
| 3.74 | w | 2.64 | wd | 2.01 | w | | |
| 3.69 | m | 2.61 | w | 2.00 | vw | | |
| 3.66 | vw | 2.57 | wd | 1.99 | w | | |
| 3.62 | w | 2.55 | w | 1.98 | w | | |
| 3.52 | w | 2.51 | w | 1.97 | vw | | |
| 3.46 | s | 2.49 | w | 1.96 | w | | |

TABLE II

Cephaloridine - butane-1,3-diol solvate

| d(A) | I | d(A) | I | d(A) | I | d(A) | I |
|---|---|---|---|---|---|---|---|
| 8.99 | m | 3.41 | s | 2.41 | w | 1.89 | wd |
| 8.28 | w | 3.35 | w | 2.39 | w | 1.88 | wd |
| 7.77 | w | 3.31 | w | 2.37 | 2 | 1.87 | wd |
| 7.51 | m | 3.28 | w | 2.36 | w | 1.84 | wd |
| 7.11 | w | 3.26 | w | 2.35 | w | 1.81 | wd |
| 6.23 | s | 3.21 | m | 2.33 | vw | 1.75 | wd |
| 6.07 | w | 3.14 | w | 2.29 | w | 1.71 | wd |
| 5.87 | w | 3.11 | w | 2.23 | w | | |
| 5.14 | m | 3.06 | w | 2.21 | w | | |
| 5.01 | m | 2.98 | md | 2.20 | w | | |
| 4.86 | m | 2.92 | m | 2.18 | w | | |
| 4.76 | m | 2.83 | w | 2.17 | vw | | |
| 4.52 | m | 2.82 | w | 2.13 | w | | |
| 4.35 | m | 2.79 | m | 2.12 | vw | | |
| 3.97 | s | 2.77 | w | 2.09 | w | | |
| 3.94 | m | 2.73 | w | 2.08 | vw | | |
| 3.91 | w | 2.67 | w | 2.06 | w | | |
| 3.88 | w | 2.65 | m | 2.04 | w | | |
| 3.81 | m | 2.62 | w | 2.03 | w | | |
| 3.76 | m | 2.60 | w | 2.01 | vw | | |
| 3.72 | w | 2.57 | w | 2.00 | w | | |
| 3.66 | m | 2.55 | m | 1.98 | w | | |
| 3.63 | w | 2.50 | vw | 1.98 | w | | |
| 3.58 | w | 2.44 | w | 1.94 | wd | | |
| 3.50 | w | 2.44 | w | 1.92 | wd | | |

TABLE III

Cephaloridine - butane-2,3-diol solvate

| d(A) | I | d(A) | I | d(A) | I |
|---|---|---|---|---|---|
| 8.94 | w | 3.28 | vw | 2.25 | vw |
| 7.82 | m | 3.26 | vw | 2.11 | vwd |
| 7.20 | w | 3.17 | wd | 2.02 | vwd |
| 6.18 | m | 3.10 | wd | 2.00 | vw |
| 5.92 | w | 3.01 | w | | |
| 5.84 | w | 2.97 | wd | | |
| 5.26 | m | 2.87 | w | | |
| 5.09 | m | 2.83 | w | | |
| 4.92 | m | 2.79 | w | | |
| 4.75 | m | 2.74 | wd | | |
| 4.68 | m | 2.67 | wd | | |
| 4.49 | w | 2.65 | vw | | |
| 4.31 | m | 2.63 | wd | | |
| 4.05 | m | 2.59 | md | | |
| 3.98 | m | 2.57 | w | | |
| 3.93 | vw | 2.54 | vwd | | |
| 3.89 | m | 2.49 | vw | | |
| 3.84 | m | 2.45 | w | | |
| 3.67 | vw | 2.42 | wd | | |
| 3.64 | wd | 2.39 | vwd | | |
| 3.50 | md | 2.37 | w | | |
| 3.46 | vw | 2.34 | wd | | |
| 3.43 | w | 2.30 | vw | | |
| 3.35 | wd | 2.28 | vw | | |
| 3.31 | w | 2.25 | w | | |

TABLE IV

Cephaloridine propane-1,3-diol solvate

| d(A) | I | d(A) | I | d(A) | I |
|---|---|---|---|---|---|
| 10.10 | m | 3.28 | w | 2.25 | wd |
| 8.22 | w | 3.23 | w | 2.23 | w |
| 7.82 | w | 3.16 | m | 2.18 | wd |
| 7.47 | m | 3.09 | vw | 2.14 | wd |
| 7.17 | w | 3.05 | vw | 2.06 | wd |
| 6.30 | m | 2.99 | md | 2.02 | wd |
| 6.10 | w | 2.93 | w | 1.99 | w |
| 5.94 | md | 2.85 | w | 1.98 | w |
| 5.18 | m | 2.83 | vw | 1.92 | w |
| 4.98 | m | 2.80 | m | 1.87 | wd |
| 4.88 | w | 2.76 | vw | | |
| 4.80 | w | 2.74 | vw | | |
| 4.73 | m | 2.72 | w | | |
| 4.38 | m | 2.68 | w | | |
| 3.99 | m | 2.66 | vw | | |
| 3.94 | m | 2.64 | m | | |
| 3.88 | w | 2.62 | vw | | |
| 3.81 | m | 2.60 | vw | | |
| 3.74 | m | 2.58 | m | | |
| 3.70 | w | 2.49 | md | | |
| 3.64 | w | 2.44 | vw | | |
| 3.59 | w | 2.42 | w | | |
| 3.53 | w | 2.41 | vw | | |
| 3.40 | md | 2.39 | wd | | |
| 3.33 | w | 2.33 | wd | | |

PHARMACEUTICAL EXAMPLES

A. Intramuscular Injection
Composition of Single Injection
Cephaloridine butane-1,3-diol solvate     500 mg
Water for injection to produce     3 ml.

The active ingredient was dissolved in the water in the proportions specified and the resulting solution sterilized by filtration through a No. 5/3 sintered glass filter. The sterilized solution was distributed in 3.2 ml. portions into 3 ml. ampoules and the ampoules sealed hermetically. The ampoules were then subjected to sterility tests in the usual manner.

B. Intramuscular Injection
Composition of Single Injection
Cephaloridine butane-1,3-diol solvate
(sterile)     500 mg
Lignocaine hydrochloride (sterile)     30 mg A dry mixture of the above was filled into a 5 ml. glass vial in a sterile atmosphere. The vial was sealed with a butyl rubber disc.

When required for use a clinician adds approximately 3.0 ml. of sterile water for injection to the vial, shakes for a moment to dissolve, withdraws the solution into a syringe and then injects the solution in the patient.

We claim:

1. A crystalline 1:1 stoichiometric complex of cephaloridine with an alkane diol having from three to eight carbon atoms and having two or three carbon atoms linking the two oxygen atoms of the hydroxy groups.

2. A crystalline complex as defined in claim 1 wherein said alkane diol has the formula:

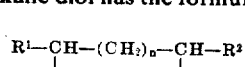

wherein $R^1$ and $R^2$ are independently selected from the group consisting of hydrogen and methyl and $n$ is selected from the group consisting of 1 and, when $R^1$ and $R^2$ are both methyl, 0 and 1.

3. A crystalline complex as defined in claim 1 wherein said alkane diol is propane-1,3-diol.

4. A crystalline complex as defined in claim 1 wherein said alkane diol is butane-1,3-diol.

5. A crystalline complex as defined in claim 1 wherein said alkane diol is butane-2,3-diol.

6. A crystalline complex as defined in claim 1 wherein said alkane diol is pentane-2,4-diol.

7. A process for the preparation of a crystalline 1:1 stoichiometric complex of cephaloridine as defined in claim 1 which comprises contacting an addition salt of cephaloridine and an acid having a pKa of 4 or less with the alkane diol in a medium to which is added an inorganic base or an organic base having a pKb of less than 6 and allowing the solvate to crystallize out.

8. A process as defined in claim 7 wherein said organic base is a tri-(lower alkyl)amine.

9. A process as defined in claim 7 wherein said inorganic base is an alkali metal or ammonium salt of a weak acid.

10. A process as defined in claim 7 wherein said acid addition salt is cephaloridine hydronitrate.

* * * * *